(12) United States Patent
Geiser

(10) Patent No.: US 9,075,158 B2
(45) Date of Patent: Jul. 7, 2015

(54) USING A DRILL BIT AS A SEISMIC SOURCE FOR SET VELOCITY ANALYSIS

(75) Inventor: Peter Anderson Geiser, Lyons, CO (US)

(73) Assignee: Global Microseismic Services, Inc., Missouri City, TX (US)

( * ) Notice: Subject to any disclaimer, the term of this patent is extended or adjusted under 35 U.S.C. 154(b) by 740 days.

(21) Appl. No.: 13/302,009

(22) Filed: Nov. 22, 2011

(65) Prior Publication Data
US 2013/0128693 A1 May 23, 2013

(51) Int. Cl.
*G01V 1/42* (2006.01)
*G01V 1/28* (2006.01)
*G01V 1/30* (2006.01)

(52) U.S. Cl.
CPC .............. *G01V 1/288* (2013.01); *G01V 1/303* (2013.01); *G01V 1/42* (2013.01); *G01V 2210/1234* (2013.01); *G01V 2210/65* (2013.01)

(58) Field of Classification Search
USPC .............................................. 367/57; 702/18
See application file for complete search history.

(56) References Cited

U.S. PATENT DOCUMENTS

| | | | |
|---|---|---|---|
| 2,062,151 A | 11/1936 | Weatherby | |
| 4,964,087 A | 10/1990 | Widrow | |
| 4,965,774 A | 10/1990 | Ng et al. | |
| 5,012,453 A | 4/1991 | Katz | |
| 5,050,130 A | 9/1991 | Rector et al. | |
| 5,963,508 A * | 10/1999 | Withers | 367/38 |
| 6,389,361 B1 | 5/2002 | Geiser | |
| 6,868,037 B2 | 3/2005 | Dasgupta et al. | |
| 7,127,353 B2 | 10/2006 | Geiser | |
| 7,460,437 B2 | 12/2008 | Sicking et al. | |
| 7,512,034 B2 | 3/2009 | Haldorsen | |
| 7,660,194 B2 * | 2/2010 | Uhl et al. | 367/25 |
| 2006/0077757 A1 | 4/2006 | Cox et al. | |
| 2011/0203846 A1 | 8/2011 | Degrange et al. | |
| 2011/0255371 A1 * | 10/2011 | Jing et al. | 367/73 |
| 2013/0100769 A1 * | 4/2013 | Riley et al. | 367/37 |

OTHER PUBLICATIONS

The use of drill-bit energy as a downhole seismic source, Rector, Geophysics, vol. 56, May 1991, p. 628-634.
Seismic While Drilling for Geophysical Exploration in a Geothermal Well Poletto et. al., Enhanced Abstracts, Society of Exploration Geophysicists Annual Convention, San Antonio, TX, Oct. 2011.
Seismic While Drilling for Geophysical Exploration in a Geothermal Well Poletto et. al., Geothermal Resources Council 2011 Annual Meeting, San Diego, CA, Oct. 2011.
U.S. Appl. No. 13/277,178, filed Oct. 19, 2011, Diller et. al.

* cited by examiner

*Primary Examiner* — Ian J Lobo

(57) ABSTRACT

Disclosed are various embodiments of methods for determining the velocity of seismic energy in geologic layers using Seismic Emission Tomography (SET) imaging of drill bit noise, by recording microseismic data during a drilling operation, recording the time and the position of a drill bit in a well bore during the drilling operation, processing the microseismic data using SET software to image microseismic events proximate a known time and position of the drill bit using an estimated velocity model, computing the difference between the known time and position of the drill bit and the time and position of the microseismic event determined from the SET data, varying the estimated velocity model to minimize the difference between the known time and position of the drill bit and the time and time and position of the microseismic event determined from the SET data.

25 Claims, 6 Drawing Sheets

USING A DRILL BIT AS A SEISMIC SOURCE FOR SET VELOCITY ANALYSIS

FIELD

Various embodiments described herein relate to the field of seismic data acquisition and processing, and devices, systems and methods associated therewith.

BACKGROUND

In recent years, it has become apparent that large reserves of hydrocarbons are to be found in what are referred to as "unconventional" oil and gas bearing geologic layers. These unconventional layers, which include rock types such as shales, are typically not highly permeable, and therefore present formidable obstacles to production. The most common technique in use today that permits commercial production of natural gas and oil from such layers is hydraulic fracturing, also referred to as "fracing" or "fracking". This technique can be also be applied to older wells drilled through conventional hydrocarbon-bearing layers to increase the proportion of hydrocarbons that can be extracted from them, thus prolonging well life.

The progress of a fracturing operation must be monitored carefully. Well fracturing is expensive, and the fracturing process is frequently halted once its benefits become marginal. The high pressures associated with fracturing result in new fractures that tend to follow existing faults and fractures, and can result in an uneven or unpredictable fracture zone. Fracturing fluid may also begin following an existing fault or fracture zone and then propagate beyond the intended fracture zone. Care must be taken not to interfere with existing oil or gas production wells in the area. For these and other reasons, it is important that the that the operator be able to accurately predict where the fluid injection will go.

One method of imaging fractures within geologic layers is known as "Tomographic Fracture Imaging", or "TFI". Very low level seismic ("microseismic") energy emitted by the hydraulic fracturing of a geologic layer is sensed and recorded. The recorded data are used to determine the point of origin of the emitted microseismic energy and thus define the location of the fracture.

For effective monitoring of a fracturing operation, those controlling the operation need a near-real-time display of one or more attributes characteristics of microseismic data, capable of indicating the points of origin of microseismic energy in the subsurface, and the growth of a fracture network over time. Computing such an display requires an accurate estimate of the velocities at which seismic energy travels through the subsurface of the Earth in the area of interest. To enable a near-real-time result, it is very helpful to determine this velocity data before the fracturing operation begins, thus saving computational steps and time while the operation is in progress. Among other things, what is required is a method of determining the velocities of the seismic energy through the different geologic layers before the fracturing operation begins.

SUMMARY

In one embodiment, there is provided a method for determining the velocity of seismic energy in geologic layers using Seismic Emission Tomography (SET) imaging of drill bit noise, comprising recording microseismic data during a drilling operation; recording times and positions corresponding to such times of a drill bit in a well bore during the drilling operation; processing the microseismic data using an estimated velocity model to image microseismic events corresponding to the drill bit times and positions; determining the times and locations of microseismic events corresponding to the drill bit times and positions in the microseismic data, and computing, from the microseismic data, differences between the drill bit times and positions and times and positions of microseismic events corresponding thereto.

In another embodiment, there is provided a method for determining the anisotropy of the velocity of seismic energy in geologic layers using Seismic Emission Tomography (SET) imaging of drill bit noise, comprising recording microseismic data during a drilling operation using a plurality of sensors; recording times and positions corresponding to such times of a drill bit in a well bore during the drilling operation; selecting subsets of the microseismic data corresponding to sensors having selected azimuths from the positions of the drill bit; processing the subsets of the microseismic data using an estimated velocity model to image microseismic events corresponding to the drill bit times and positions; determining the times and locations of microseismic events corresponding to the drill bit times and positions in the microseismic data, and computing, from the microseismic data, differences between the drill bit times and positions and times and positions of microseismic events corresponding thereto.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

Figure 1:
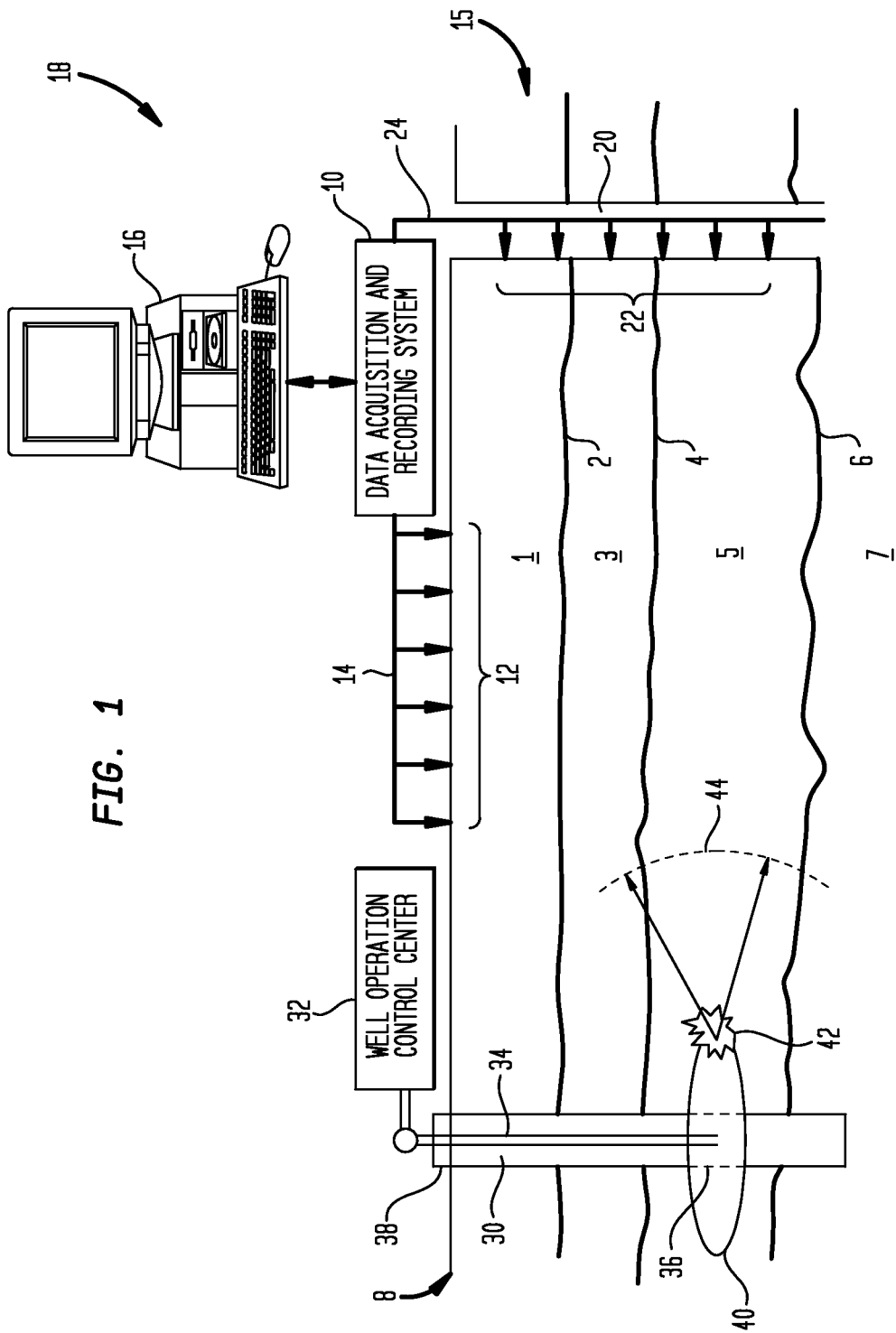
FIG. 1 shows one embodiment of a cross-sectional view of the earth and corresponding data acquisition, recording and analysis system 18.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well known methods, processes and devices and systems finding application in the various embodiments described herein are not disclosed in detail.

In the drawings, some, but not all, possible embodiments are illustrated, and further may not be shown to scale.

For the first 100 years and more of oil exploration and production, vertical wells were drilled almost exclusively in geologic layers that permitted production of oil and gas flowing under the natural pressures associated with the layers. Such production required that two physical properties of the geologic layer fall within certain boundaries. The porosity of the layer had to be sufficient to allow a substantial reserve of hydrocarbons to occupy the interstices of the layer, and the permeability of the layer had to be sufficiently high that the hydrocarbons could move from a region of high pressure to a region of lower pressure, such as when hydrocarbons are extracted from a layer. Typical geologic layers having such properties include sandstones.

Where the permeability of the geologic layer was not very high, it was necessary to drill multiple wells close together, to extract hydrocarbons from the entire extent of the geologic layer. As the technology evolved, it became possible to drill multiple wells from very closely clustered starting locations, and steer the drill bit in different directions out from the starting point. The angle at which a drill bit could be steered, and hence the possible deviation of the well, has progressively increased.

In recent years it has become apparent that huge reserves of oil and gas are to be found in geologic layers that have low permeability. These reserves often occur as shales and other rocks in which the hydrocarbons were originally formed. "Conventional" drilling targets reservoir rocks, where oil and gas has seeped from the source rocks and has accumulated. The new "unconventional" oil and gas exploration is aimed at the source rocks, with the goal of extracting the hydrocarbons that remain within the source rocks. This resource has the potential of doubling the world's hydrocarbon resource base. The problem is how to extract these reserves, because the oil or gas does not flow well through this type of low-permeability rock. New drilling methods have been developed to address this problem.

Drilling technology is no longer limited to the drilling of vertical wells and has evolved to allow wells to be deviated, that is, the direction of drilling may be changed such that a well can be drilled along virtually any direction or azimuth, including horizontally. Such deviated wells are often drilled along specific geologic layers to increase production potential by increasing the extent of the well bore that is in contact with the hydrocarbon-bearing layer. The extent of a hydrocarbon-producing layer in a vertical well may be measured in feet, or perhaps tens or hundreds of feet in highly productive areas. The maximum area of the layer in contact with a vertical well bore is quickly computed as the circumference of the well multiplied by the height of the producing layer. In practice, the producing area is much less than this figure. By drilling horizontally or non-vertically through a layer, the extent of the layer in contact with the wellbore can be much greater than is possible with vertically-drilled wells. A horizontal well may extend for hundreds or thousands of feet through a layer. However, in these unconventional geologic layers, such as gas shales, even this may not be adequate to ensure hydrocarbon production, because such layers have very low permeability.

Oil and gas producers therefore developed the technique of hydraulic fracturing. Hydraulic fracturing involves pumping fluid under very high pressure into hydrocarbon-bearing rock layers to force open and enlarge cracks and fissures and thereby increase significantly the total volume of the subsurface from which the hydrocarbons can be extracted, allow the hydrocarbons residing therein to flow more freely and provide pathways for the hydrocarbons to migrate to the vertical well and hence to the surface. Usually the fluids injected into such layers contain chemicals to improve the flow of the fracturing fluid or the hydrocarbons, and also contain "proppants" (an industry term for substances such as sand). When the fracturing fluid is removed, and the hydrocarbons are allowed to flow towards the vertical well and the surface, the sand grains prop open the fractures and prevent their collapse, which might otherwise quickly stop or reduce the flow of hydrocarbons.

The fracturing process is expensive and requires large quantities of water and sand. The process has to be monitored closely in order to make sure that the fracturing is effective, and that the fracturing is confined to the intended geologic layer. Because of the very high pressures involved, the fracturing fluids may expand existing faults and fractures, leading to a loss of fluid, a drop in pressure, and an incomplete fracturing operation. The personnel monitoring the fracturing operation need some way of monitoring the progress of the fluid front as the fracturing fluid is pumped into the well and fractures open up under pressure.

Seismic surveys are frequently used to locate potential sources of oil and gas, estimate recoverable reserves, and select optimal drilling locations. The method of seismic surveying that has been used for many years involves generating seismic energy at or proximate to the surface of the earth using explosive, impact, or vibrating sources of seismic energy. The rise of new methods of seismic surveying has resulted in this approach being referred to as "conventional seismic" surveying, or sometimes as "surface seismic" surveying. It may also be referred to as "reflection seismic" surveying, because it relies on the fact that sound waves generated by seismic sources are reflected back to the surface at each interface between different geologic layers. These reflections arise because the velocity of the seismic waves through the different geologic layers varies. The change in the velocity of the seismic waves results in some of the seismic energy being reflected back towards the surface. Sensors on or proximate the surface of the earth detect the reflected seismic energy, which is recorded in digital form for data processing and analysis.

Once the exploitation of the oil and gas reserves has begun, the conventional seismic survey may be repeated periodically to monitor the development of the oil and gas resources. It is not uncommon for a seismic survey to be conducted before the hydraulic fracturing begins, and then the survey repeated upon completion of the fracturing. A conventional seismic survey provides information about the properties of geologic layers in the subsurface. Analysis of how these properties have changed assists in evaluating the effectiveness of the fracturing process. An additional benefit is that it is possible, and indeed a necessary step in processing the conventional seismic data, to derive information about the velocity of seismic waves through different geologic layers.

In order to convert recorded seismic data to a representation showing the geologic layers in the subsurface, it is necessary to know or estimate the velocities at which seismic waves propagate through the sequence of geologic layers. In conventional seismic surveys, where a controlled source of seismic energy is used, the recorded data show the time required for the seismic energy to travel through the geologic layers and then be reflected back to the surface. The time taken by the seismic energy to travel from the source to the interface between geologic layers, and the velocities of the seismic waves through the geologic layers are known. Thus it is possible to convert the results to show the depth of the geologic layers, which is the information the geologists and drilling engineers need. There are several ways, well known in the art, to compute these velocity data that depend on knowing the locations of the seismic source and the geophysical sensors, and the time at which the source was activated. These techniques are not applicable to microseismic data, as both the location of the seismic source and the time at which the seismic energy was emitted are unknown.

Although much information about the subsurface may be obtained through the use of conventional seismic surveys, there are many reasons why this type of seismic survey is not suited for monitoring hydraulic fracturing operations. Conducting a seismic survey is expensive, and there may be other problems, including limited access to surface locations at which seismic sources may be activated, environmental costs and remediation costs. One major reason why conventional seismic surveys are not used in hydraulic fracturing is that is impractical to monitor the progress of the hydraulic fracturing operation in close-to-real-time. It takes considerable time to collect the data for a seismic survey, and more time to process the data to provide a useful image of the subsurface.

Further, conventional surface seismic reflection surveys generally do not work well for monitoring the movement or positions of fluid fronts in the subsurface. The physical dimensions of fractures are much shorter, often in the order of a few feet, than can be detected using conventional surface seismic reflection techniques. Furthermore, within a given geologic layer there may be no contrasts or only low contrasts in seismic velocity, and as a result surface seismic reflection techniques cannot be used effectively to image fractures within the layer. Fractures tend to scatter seismic energy, further complicating their detection by conventional surface seismic reflection surveying techniques. A different method monitoring the hydraulic fracturing and the movement of the fracturing fluid through the geologic layers is needed.

In recent years the branch of geophysics known as "microseismic" or "passive seismic" has undergone rapid growth and transformation. The science has its origins in earthquake seismology and in technology developed to monitor nuclear tests. Many of the techniques developed for these purposes have been adapted and expanded in order to address the problem of imaging fractures or expanding fluid fronts within geologic layers during the process of hydraulic fracturing. Instead of using "active" surface seismic energy sources, "passive seismic" techniques detect seismic energy generated in the subsurface of the earth by the movement of faults or opening of fractures. Seismic energy is emitted during fracturing of a geologic layer by the injection of high pressure fracturing fluid into the layer. This seismic energy is sensed and recorded by sensors on or proximate the surface of the earth. The recorded data are then processed and analyzed to determine the point of origin of the emitted seismic energy, and thus define the location of the fracture.

One method of using microseismic data for locating fractures and faults in geologic layers is known as Seismic Emission Tomography (SET). Examples of SET techniques and processes are described in U.S. Pat. No. 6,389,361 to Geiser entitled "Method for 4D permeability analysis of geologic fluid reservoirs" (hereafter "the '361 patent") and in U.S. Pat. No. 7,127,353 to Geiser entitled "Method and apparatus for imaging permeability pathways of geologic fluid reservoirs using seismic emission tomography" (hereafter "the '353 patent"), the disclosures of which are hereby incorporated by reference herein in their respective entireties. The SET process enables "Tomographic Fracture Imaging" or "TFI".

The SET process entails recording microseismic data using an array of sensors, located on or proximate the surface of the earth, in the well that is to be fractured, in another well or wells, or in one or more boreholes drilled for the purpose of placing sensors. Data are recorded at sensor locations in a digital format as a time series, referred to as a "trace", over a given time period. The duration of recording and the sampling interval are determined by the objectives of the microseismic data acquisition process, the characteristics of the events that generate the detected or sensed microseismic energy, the distances involved, the characteristics of the subsurface, and other factors.

Once the seismic data have been recorded, they must be processed and converted a set of data values that represent useful information, and that information must be displayed in a readily understandable format. Examples of such displays may be found in the above-referenced '361 and '353 patents, where some SET data acquisition and processing techniques are described in detail. The data recorded at each sensor location are filtered and processed using SET processing techniques and software, some of which are described in the '361 and '353 patents, that convert the data into a series of gridded subsurface volumes corresponding to multiple time samples. The values of the points in the grid represent attributes of the data, and such values vary over time as the energy emitted at each point in the subsurface varies.

In at least some SET techniques and processes, the subsurface of the earth is subdivided into a 3D grid, and the cells in the grid are referred to as "voxels". A "voxel" or "volume element" is the 3D equivalent of a 2D "pixel" or "picture element". While various different algorithms may be used to transform the acquired data, the end result is typically the same: a series of SET spatial volumes are produced, where each SET spatial volume is associated with a given data subset, and each data subset corresponds to a given time window. The values corresponding to the voxels within the spatial volume represent the amount of energy emitted from each voxel during a given time window. The changes in the spatial volume from one time window to the next allow the fracturing process to be monitored in close to real time.

According to some embodiments of the SET method, the subsurface is divided into a 3-Dimensional grid with a grid element or voxel size sufficiently fine to provide the degree of resolution required, usually about a few meters.

In various embodiments of the SET method, the energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data which will be apparent to those skilled in the art.

As recorded, the microseismic data traces recorded at each sensor location correspond to the microseismic energy reaching that sensor location from multiple points of origin in the subsurface of the earth. The objective of the microseismic data processing is to determine the point in the subsurface and the time at which this microseismic energy originated. Unlike conventional seismic data, which uses a controlled energy source at a known location that is activated at a known time, microseismic data originates at a point of fracture in the subsurface at an unpredictable time. As a considerable extent of the subsurface is under pressure from the hydraulic fracturing fluid, multiple fractures may occur at different locations but close in time. Further complicating the analysis is the difficulty of distinguishing microseismic energy emitted close to the surface just a short time before it reached the sensor from microseismic energy emitted deeper in the subsurface at an earlier time. The latter takes longer to reach the sensor, so it may arrive at the same time as energy from a later, shallower origin would arrive.

The solution to this problem involves projecting back the microseismic energy to multiple possible points of origin in the subsurface. A microseismic event such as a fracture will emit energy that is detected and recorded at multiple sensors. Using various algorithms, some of which are described in the '361 and '353 patents, the microseismic data recorded at multiple sensor locations are projected back to possible points of origin. If microseismic energy was emitted from a given point in the subsurface, then the data tend to add constructively at that point. If no energy was emitted from a given point in the subsurface, then the data cancel out.

According to some embodiments of the SET process, each point in the subsurface grid is treated as if it is a possible source of microseismic energy. Using a known or estimated seismic velocity model, it is possible to compute the time a release of energy at a point at a given depth in the subsurface would take to reach each sensor on or proximate the surface, where it would be recorded as part of the seismic data trace for the sensor. Knowing this time, it is possible to take the seismic data trace recorded at a sensor, and apply a time shift to it, such that the result is a seismic data trace corresponding to what might have been recorded at the point in the subsurface at which the energy was emitted.

Data traces recorded at multiple sensor locations are shifted in time so that the traces correspond to the seismic energy which may have been emitted from a point in the subsurface. The process is repeated for every sensor within a predetermined range from the point in the subsurface, such that if there a N sensors within this range, there are N seismic traces corresponding to the data that would have been recorded at the point in the subsurface at which the energy was emitted. These N seismic traces are summed or "stacked", or their semblance is computed. If an actual microseismic event did occur at this point in the subsurface, then the N seismic traces add constructively to show a high value for the stacked output, or the N seismic traces show a high degree of similarity as shown by a high semblance value.

If the time shifts applied to each of the N seismic traces are not optimal, then the traces do not align correctly and the microseismic events may not be detected. The accuracy of the time shifts depends on the accuracy of the information about the velocities at which the seismic energy travels through the geologic layers from the source of the microseismic event up to the surface. The velocity is different for each geologic layer through which the seismic energy travels. The velocity may also vary within a geologic layer, both vertically and laterally. Even a relatively small error in the velocity data may result in the microseismic event being undetectable.

Microseismic data presents greater challenges than conventional seismic data for the analysis of the velocity data. First, the signals are very much weaker than in the case of a conventional seismic source, and microseismic events are often hidden in the noise. The fracturing operation may be performed deep in the subsurface, typically at a depth of 10,000 to 12,000 feet. The fractures created in the geologic layers are small. It follows that the level of the seismic energy received at the sensors proximate the surface of the earth is low. The microseismic events can only be detected by summing or stacking multiple seismic traces, or looking for similarities between traces by computing the semblance. Stacking requires that the signals be aligned using the appropriate time shift—which depends on the velocity model used. Second, the time at which the seismic energy was emitted is not known. When a microseismic event is detected, the question arises as to whether this is a very recent event from near the surface of the Earth, or an event which occurred much deeper in the Earth some time previously, possibly several seconds previously. Techniques such as SET processing can resolve this question, but the confidence with which they do so is constrained by the accuracy of the velocity model used.

Several other factors make the analysis of microseismic data more complicated. Microseismic energy recorded by seismic sensors on the surface of the earth may have been released by movement of the subsurface along a fault/slip plane. Because the two sides of the fault plane move in opposing directions, the energy emitted on one side is approximately opposite in phase to the energy emitted by the other side. For example, one side of the fault plane may move up, and the other side move down, producing what is referred to as a "double-couple" source. The energy release from such a source is very different from that released by a conventional seismic source, in which explosive, impulsive, vibratory or other means are used to generate a seismic event. The double-couple source energy varies greatly with direction or azimuth, and has very distinct azimuthally dependent phase characteristics. P-waves and S-waves have different azimuthally dependent phase characteristics. P and S waves travel at different velocities.

Because of the double-couple source mechanism, propagation of the energy released by the fault motion can differ greatly depending on direction or azimuth. Consequently the N microseismic traces do not have the same phase and amplitude characteristics, and thus do not stack constructively. To overcome this problem, in some embodiments, the N seismic traces have a phase or phase and amplitude compensation applied to account for the different azimuths of each of the N traces from the point in the subsurface. This is described in detail in U.S. patent application Ser. No. 13/277,178, "Method for Imaging Microseismic Events Using an Azimuthally-dependent Focal Mechanism" to Diller et. al., filed on Oct. 19, 2011, (hereafter "the Ser. No. 13/277,178 patent application") which is hereby incorporated by reference herein in its entirety.

Further complicating the analysis of the velocities of the seismic energy through the geologic layers is that the layers may exhibit anisotropy. That is, the velocity of the seismic energy originating at a point may be different in different directions. Where the layers are under tectonic stress, the stress varies by direction, which causes this azimuthal variation in the velocity. This problem is discussed for conventional seismic data in U.S. Pat. No. 7,460,437 to Sicking et. al, entitled "Seismic data processing method and system for migration of seismic signals incorporating azimuthal variations in the velocity", (hereafter "the '437 patent"), the disclosure of which is hereby incorporated by reference herein in its entirety.

In SET processing, each element of the subsurface grid is evaluated to determine the locations of microseismic events. These events occur at unknown times and locations, may have azimuthally-dependent amplitude and phase characteristics, and the energy from these events travels through the subsurface at velocities that vary throughout the subsurface, with an azimuthal component. This analysis takes time and computing power, in part because the times at which the microseismic events are unpredictable, and therefore it is necessary to record and process data over some period of time. This time may be minutes, hours, or days. When a fracturing operation is taking place, the subsurface area of interest may be restricted to a zone centered about the segment of the well being fractured, and the time of the recording may be limited to the duration of the fracturing operation. This still requires scanning through a large amount of data looking for microseismic events and determining their times and spatial locations.

Some of the complexity in identifying microseismic events in the subsurface may be reduced if information is already known about the velocity characteristics of the subsurface. This information may be available from other geophysical measurements made during the surveying of the areas and drilling of the well.

It is possible to use velocity data obtained from a conventional seismic survey when processing microseismic data. In practice this data may not always be available, or may lack the spatial resolution required to account for local variations in the velocities of the seismic waves in different geologic layers. Other methods of determining the velocities of seismic waves through the geologic layers include recording during the "perf shots", that is, when small explosive charges are detonated inside the well casing to perforate it and allow the outward flow of hydraulic fracturing fluid and the inward flow of hydrocarbons. A similar technique uses small charges known inside the well bore, known as "string shots". These methods are limited to sources at a few locations within the well bore, and are only possible at limited times during the drilling process. It is also possible to use velocity data obtained from well logs, but these data are limited to the volume of the subsurface proximate the well bore. Ideally, the velocity model of the subsurface used for processing microseismic data should be derived using microseismic processing techniques, thus optimizing the results of the microseismic data processing.

One method of determining the velocity information is to process the microseismic data using many possible combinations of time, spatial location and velocity information, in order to find which combination most effectively images the microseismic events. This approach is time-consuming, precluding its use when the fracturing operation is in progress and results are needed in close to real time. Further, because the velocity of the seismic energy varies vertically and horizontally with the different geologic layers, and sometimes by azimuth, estimates must be made of the velocity at multiple points in the subsurface in order to compute the travel time of the seismic energy to a sufficient level of accuracy.

What is required is a way of removing some of the many variables and computing a detailed and accurate model of the velocities of the seismic waves through the subsurface, before the fracturing operation is begun. According to some embodiments, this may be done using the noise generated by the drill bit as the well is being drilled. During the drilling operation, the location of the drill bit is known precisely at all times. Thus, the spatial position and the time of the source of the seismic energy are removed as variables. This allows the velocity to be determined accurately. Further, the velocity information is available when the fracturing operation begins. Ideally, the velocities used for processing the microseismic data should be computed from the surface all the way down the wellbore. As the well bore is drilled horizontally, there is an opportunity to analyze the horizontal variation of the velocities of the seismic waves in the geologic layers above the horizontal well bore. Computing velocity information using the SET process assures that the velocity information is optimized for this technique, and can be applied to SET processing of the microseismic data recorded during the hydraulic fracturing process.

It should be noted that the collection of data and the computation of velocity information with a drill bit a a seismic source using conventional surface seismic recording and processing techniques, as distinct from microseismic techniques, has been described previously. See "*The use of drill-bit energy as a downhole seismic source*", J. W. Rector, III and B. P. Marion, Geophysics, Vol. 56, No. 5 (May 1991) p. 628-634.

See also "*Seismic While Drilling for Geophysical Exploration in a Geothermal Well*", Poletto et. al., Enhanced Abstracts, Society of Exploration Geophysicists Annual Convention, San Antonio, Tex., October 2011, and "*Seismic While Drilling for Geophysical Exploration in a Geothermal Well*", Poletto et. al., Geothermal Resources Council 2011 Annual Meeting, San Diego, Calif., October 2011.

Referring now to FIG. 1, there is shown one embodiment of how microseismic data are acquired during a hydraulic fracturing operation. Depicted is a cross-sectional view of the earth in the vicinity of well bores 20 and 30, including geologic layers 1, 3, 5, and 7, with interfaces 2, 4 and 6 between these geologic layers. A hydraulic fracturing operation is in progress in wellbore 30. Under the control and direction of well operation control center 32, hydraulic fracturing fluid is pumped into wellbore 30 at high pressure through pipe 34. The high pressure of the pumping operation forces fracturing fluid out of the wellbore 30 and through perforations 36 in wellbore 30 into hydrocarbon producing geologic layer 5. As the fracturing fluid flows outwardly 40 from wellbore 30 and into geologic layer 5, the high pressure of the fluid fractures surrounding geologic layer 5, causing one or more releases of seismic energy 44 at point of fracture 42. This seismic energy 44 propagates through subsurface 15 of the earth through geologic layers 1, 3, 5, and 7 as a series of acoustic wavefronts or seismic waves. Seismic wavefronts and energy 44 emitted at point of fracture 42 caused by the fracturing of geologic layer 5 by the fracturing fluid are sensed by surface sensors 12 disposed along surface 8 and/or downhole sensors 22 disposed in well bore 20 and converted into electrical, optical and/or magnetic analog or digital signals. The electrical, optical and/or magnetic analog or digital signals generated by sensors 12 and 22 in response to sensing seismic energy or wavefront 44 are representative of the detected or sensed seismic energy, and are recorded as data by acquisition and recording system 10.

As further shown in FIG. 1, data acquisition, processing and interpretation/analysis system 18 comprises surface sensors 12 and downhole sensors 22 operably connected to data acquisition and recording system 10, and data processing computer 16 operably connected to data acquisition and recording system 10. Note that FIG. 1 shows only one of many possible embodiments of system 18 for acquiring, processing and interpreting/analyzing microseismic data in a well setting. According to one embodiment, data may be recorded, processed and analyzed or interpreted while fracturing is occurring, thereby permitting near-real-time monitoring of the fracturing process.

Data acquisition and processing configurations other than that shown in FIG. 1 may be employed. For example, only surface sensors 12 may be employed or only downhole sensors 22 may be employed, and downhole sensors may be employed in well bore 30 in addition to or instead of in well bore 20. Seismic sensors 12 and 22 may be deployed along surface 8 and in well bore 20 and/or well bore 30. Any suitable combination of surface sensors 12 and/or downhole sensors 22 may be employed. By way of example, sensors 12 and 22 may comprise one or a plurality of sensors, or arrays of sensors, and may be geophones, accelerometers, piezoelectric sensors, hydrophones, or any other suitable acoustic sensor. Note further that sensors 12 and/or 22 may be 1-, 2- or 3-mutually-othogonal axis sensors, geophones, hydrophones or accelerometers configured to generate electrical, magnetic and/or optical signals proportional to the displacement, velocity or acceleration of the earth at locations corresponding to sensors 12 and 22, where such displacement, velocity or acceleration is caused by seismic wavefront 44 arriving at the locations of sensors 12 and/or 22.

Sensors 22 may be cemented in place permanently in well bore 20 or well bore 30, and thereafter used to acquire data for multiple projects. Sensors 22 may also be lowered into well bore 20 on wireline or cable 24. The electrical, magnetic or optical signals generated by sensors 12 and/or 22 are transmitted to data acquisition and recording system 10 by cable 14 and wireline or cable 24. In other embodiments, signals generated by sensors 12 and/or 22 are transmitted by wireless transmitters to a wireless receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Sensors 12 may be arranged as shown in FIG. 1, in a substantially linear configuration extending from the well in one direction. Sensors 12 may also be deployed in a radial pattern centered on well bore 30. Further, sensors 12 may be arranged in a 2-dimensional grid on or proximate to surface 8. The grid may be positioned to enable the acquisition of data from sensors 12 surrounding well bore 30. In other embodiments, the grid of sensors 12 may be located on or proximate to surface 8 and above the intended path of one or more horizontal wells.

Sensors 22 may be located as shown in FIG. 1, in one well bore 20 drilled for the purpose of emplacing sensors, or an abandoned well bore 20. According to other embodiments, sensors 22 may be placed in a plurality of well bores 20, arranged in a radial pattern around well bore 30, or in a pattern designed to enable the collection of microseismic data in the area around well bore 30, or from planned horizontal wells.

Note further that system 18 may be employed in land, marine, off-shore rig, and transition zone settings. In addition, multiple data processing computers 16 may be employed, and/or multiple data acquisition and recording systems 10 may be employed.

Other embodiments include but are not limited to, the recording of the seismic waves created by the energy released by explosive charges during the perforation of wellbore 30. When wellbore 30 is cased with a metal pipe or casing, the casing must be perforated so that oil or gas may flow into pipe 34 and thence to the surface of the earth at wellhead 38. Small explosive charges are used to perforate the casing and create perforations 36 through which oil or gas may then flow.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 is typically, although not necessarily, in the form of digitally sampled time series referred to as seismic traces, with one time series or seismic trace for each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 125 Hz are expected to be sensed or measured in acoustic wavefront 44, data may be sampled at a rate of 2.0 milliseconds ("ms") per channel to ensure aliasing does not occur. Other sample rates are also possible such as 0.25 ms, 0.5 ms, 1 ms, 4 ms, 8 ms, 16 ms, and so on.

Figure 2:
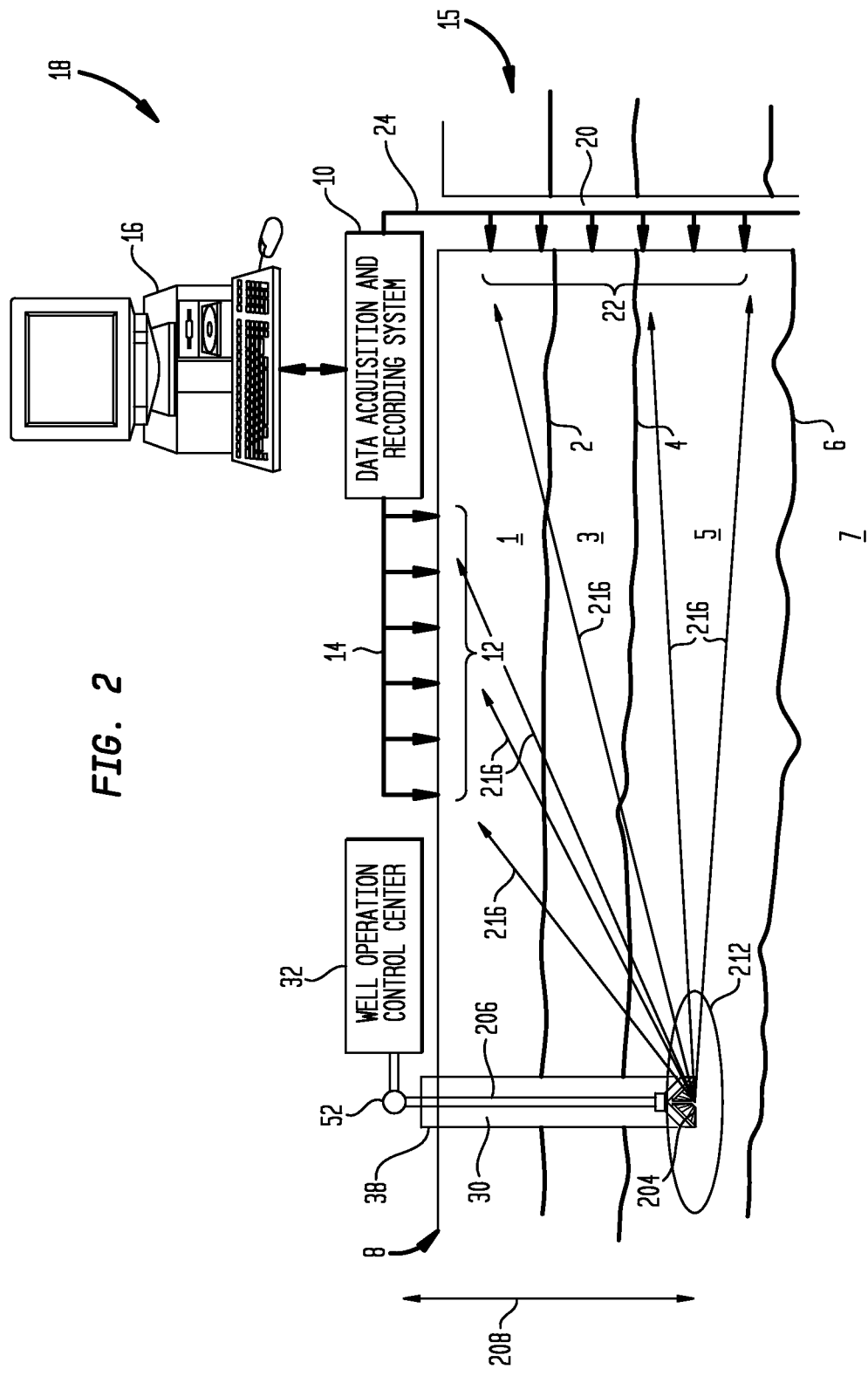
FIG. 2 shows a drill bit in use as a seismic source with the seismic energy being recorded during vertical drilling.

Referring now to FIG. 2, there is shown one embodiment of a method for recording seismic data during drilling operations to enable the determination of the velocities at which seismic energy travels through the geologic layers of the subsurface. The result of this embodiment is a list of depths and the associated velocity of seismic energy through the geologic layer at that depth. The velocity at which the seismic energy travels through a given geologic layer is often referred to as the "seismic velocity" of that layer, and the list of depths and corresponding seismic velocities is known as a "velocity model". This velocity model will vary spatially due to variations in the depth, thickness, and tilt of the geologic layers, and variations in the physical and chemical properties of the geologic layers.

It should be noted this embodiment does not fall within the normal definition of microseismic data, as the seismic energy is not emitted by faults or fractures, but rather by a known source, the noise of a drill bit. According to some embodiments, the drill bit location is recorded as a function of time continuously during the drilling operation. The location of drill bit 204 connected to drill pipe 206 at a given time is known very precisely, to within a few inches. Depth 208 of drill bit 204 is normally recorded by the drillers as a measurement in feet below Kelly bushing 52. This may be some distance above surface of the earth 8, which may be at some distance above sea level.

According to some embodiments, for microseismic data processing, depth 208 of drill bit 204 is converted a depth relative to a datum, that is, an arbitrary flat reference surface, the reduction to which minimizes local topographic and near-surface effects. In some embodiments this datum may be proximate surface 8, and in other embodiments it may be sea level or some convenient reference elevation. Surface 8 frequently is not flat, but rather has elevation changes. In some embodiments, the elevations of sensors 12 on or proximate the surface are surveyed, and corrections applied to the microseismic data acquired at sensors 12 to simulate recording with all sensors 12 at the datum. Corrections may also be applied to microseismic data acquired at downhole sensors 22 to compensate for variations in the elevation of surface at the top of boreholes 20, and hence in the elevations of downhole sensors 22 with respect to the datum.

Still referring to FIG. 2, drill bit 204 generates noise 212 at known depth 208 at a known time. Noise 212 from drill bit 204 propagates through geologic layers 1, 3 and 5 as seismic energy 216 and is detected by sensors 12 and/or 22. The electrical, magnetic or optical signals generated by sensors 12 and/or 22 are transmitted to data acquisition and recording system 10 where they are recorded as data.

According to some embodiments, microseismic data are recorded from before the drilling operation begins until after it is complete. In other embodiments, and where a velocity model of the near-surface geologic layers is already available, microseismic data recording may begin after the drilling operation has been started, and in some embodiments, where the drilling operation has been substantially completed through these layers. In yet other embodiments, microseismic data may be recorded at intervals during the drilling operation, the intervals being determined by the rate of progress of the drill bit. For example, if drilling is progressing at a rate of only a few feet per day, it may be sufficient to record the microseismic data every 2-3 days to obtain velocity information every 10-20 feet. If the drill bit is making tens of feet or more per day, it may be helpful to record the microseismic data several times each day, or else record continuously and then select subsets of the data to analyze.

In typical embodiments of SET processing of microseismic data from hydraulic fracturing operations, the microseismic energy released as a result of the fracturing is of low intensity, and is often masked by background noise. It may be necessary to record and sum microseismic data over minutes, hours, or even days, to allow the microseismic events to be visible over the noise. When analyzing drill bit noise using SET, the level of the energy released is higher, and further, the time and location are already known. Therefore in some embodiments useful results may be obtained from a relatively short recording time, or a small subset of the data, covering only a few seconds.

Still referring to FIG. 2, the microseismic data are processed using SET or other methods to image the source of the seismic energy. According to some embodiments, a known time and drill bit depth 208 are selected as a reference point, beginning when drill bit 204 is close to surface 8. An initial estimate of a velocity model is determined for the geologic layers from surface down to the reference point. A subset of the microseismic data around the reference time is processed using SET algorithms and an initial velocity estimate, and analyzed for microseismic events proximate drill bit depth 208. The initial velocity estimate is required only for the geologic layers close to the surface, at depths less than drill bit depth 208. If the initial velocity estimate is substantially correct, the microseismic event will image at the known time and depth of the drill bit. If the velocity estimate is not correct, the microseismic event will image at a point in space and time different from the reference time and drill bit depth. Should the velocity model be seriously in error, no microseismic event will image at or near the reference location of the drill bit. From the error in location, a revised velocity estimate may be computed, and the process repeated until the SET processed microseismic data forms an image at the reference location.

Still referring to FIG. 2, another reference time and drill bit depth are chosen, at some increment from the previous reference point. The previously calculated velocity information is used, with an estimate of the velocity model for the additional depth, to image microseismic data around the new reference time and depth. The velocity model may thus be refined and extended deeper into the subsurface. This process is repeated as the drilling progresses, enabling an accurate velocity model to be built up for all the geologic layers through which drill bit 204 passes.

According to some embodiments, the velocity model may be computed using subsets of the microseismic data at different azimuths from well bore 30. This is helpful in obtaining an accurate velocity model, because the geologic layers may vary in thickness in different directions from well bore 30, or may be tilted, such that the velocity model varies across the area of interest. Further, the velocity of the seismic energy varies directionally because the stresses within the subsurface vary by direction, and the different stresses influence the velocity at which the seismic energy propagates.

Using drill bit noise as a seismic source simplifies the computations needed to determine the optimum velocity model. Unlike a fracture, a drill bit is not a double-couple source of microseismic energy. Therefore phase and amplitude variations in the data caused by a double-couple source mechanism, as described in the Ser. No. 13/277,178 patent application, are not a factor when determining the location of drill bit noise using SET methods.

Still referring to FIG. 2, according to some embodiments, the drilling operation is temporarily stopped and then restarted at precisely known times and depths, to provide an additional reference for the SET processing. This procedure prevents faults or fractures proximate the drill bit location being mistaken for the drill bit location, as the image of the drill bit location will only be visible on the SET processed microseismic data during times when the drill is operating.

Figure 3:
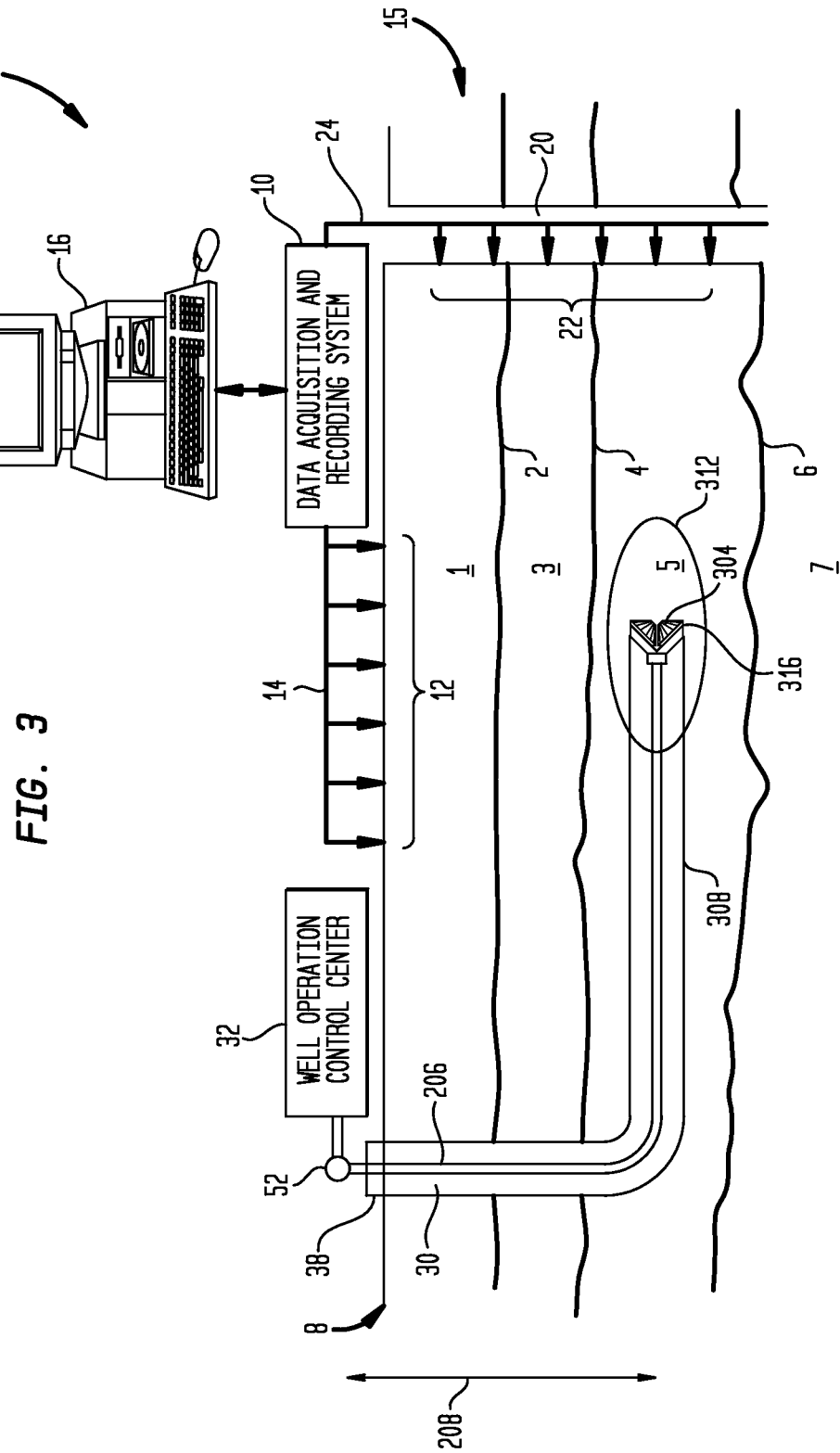
FIG. 3 shows a drill bit in use as a seismic source with the seismic energy being recorded during horizontal drilling.

Referring now to FIG. 3, there is shown one embodiment of a method for recording microseismic data during drilling operations to enable the determination of the velocity of seismic energy and the horizontal variation of this velocity in geologic layers 1, 3 and 5, where drill bit 304 has been deviated to drill substantially horizontally along well bore 308. Drill bit 304 is shown drilling through geologic layer 5, generating seismic energy in the form of noise 312 at known location 316 at a known time. Noise 312 is detected by sensors 12 and/or downhole sensors 22 and recorded by recording system 10. The seismic energy reaching sensors 12 and/or downhole sensors 22 from drill bit location 316 has traversed geologic layers 5, 3 and 1. The velocity of seismic energy and the depth and thickness of these geologic layers at well bore 30 were determined during the drilling of the vertical portion of well bore 30. As drilling proceeds along horizontal well bore 308 and further from vertical well bore 30, the depth and thickness of the geologic layers varies. The velocity at which seismic energy travels through these layers may vary, depending on the stresses in the geologic layers and other factors.

According to some embodiments, a reference time and drill bit location 316 are chosen close to vertical well bore 30. Depending on how rapidly the depth, thickness and seismic velocity of the geologic layers changes, the distance along horizontal well bore 308 from vertical well bore 30 may be tens or hundreds of feet. A subset of the microseismic data centered on the reference time and drill bit location 316 is processed using SET software, with an initial velocity estimate determined for vertical well bore 30. The velocity model is refined as necessary to image drill bit noise 312 at its proper location. In some embodiments, information from conventional surface seismic data or from other wells in the area may be used to estimate the variations in the thickness and depth of each of the geologic layers. This process is repeated as drill bit 304 proceeds along geologic layer 5, thus building a spatially-variant velocity model of the subsurface above horizontal well bore 308.

Still referring to FIG. 3, in some embodiments a plurality of substantially horizontal well bores 300 are drilled in different directions out from vertical well bore 30. Such a drilling pattern enables the creation of a velocity model for the entire area around vertical well bore 30.

According to some embodiments, microseismic data is collected for the entire duration of the drilling operation. In some embodiments, the SET velocity analysis is performed during the drilling operation at convenient intervals. In other embodiments the SET velocity analysis is done as the data become available. Such embodiments may be used, for example, when sensors 12 record the data on local storage devices, and the data are uploaded or the storage devices physically collected at intervals of several days. In yet other embodiments, the SET velocity analysis is performed after the drilling operation has been substantially competed, but before the hydraulic fracturing operation begins.

In some embodiments, the SET velocity analysis may be performed at predetermined depth or time increments. In other embodiments, the SET velocity analysis may be performed at varying increments as required by the geology of the subsurface, including the composition of the geologic layers 1, 3, 5 and 7, and the thickness of each layer. More analysis points may be required if there are many varied geologic layers, with different seismic velocities, and fewer points may be required if the geology is more uniform. In some embodiments, the number of analysis points along horizontal path 308 is determined by factors including the horizontal variation in the thickness of the geologic layers, the orientation or slope of those layers and the anisotropy of the seismic velocities.

Figure 4:
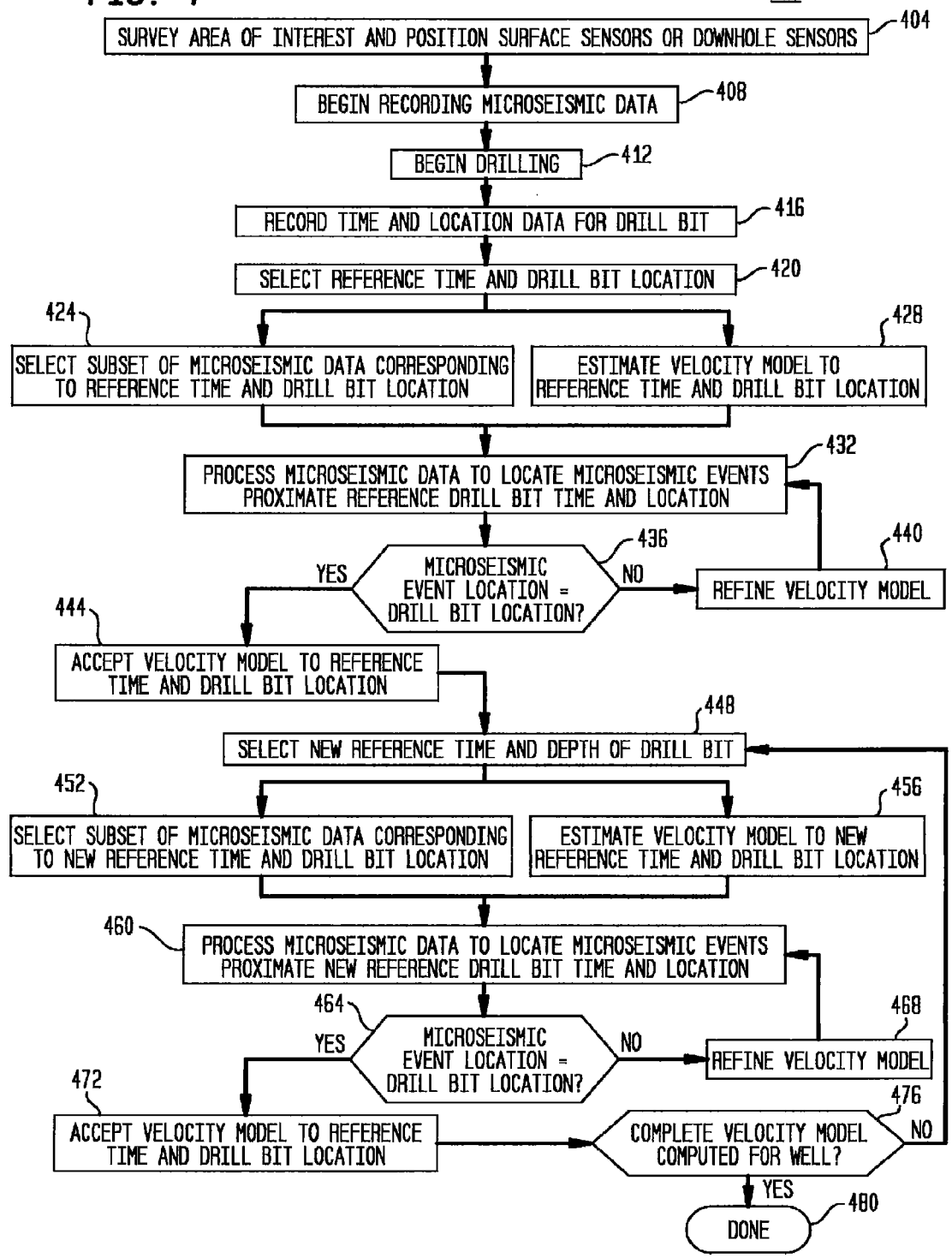
FIG. 4 shows one embodiment of a method 400 of processing microseismic data.

Referring now to FIG. 4, there is shown a flow chart of one embodiment of method 400 for determining a seismic velocity model of the subsurface using SET processing of microseismic recorded while drilling. At step 404, the surface sensors 12 and downhole sensors 22 are set in place over the area of interest, and recording from the sensors begins at step 408. At step 412, the drilling operation begins. The time and the location of the drill bit are recorded at step 416, as part of normal drilling procedure. It should be noted that the location of the drill bit includes spatial coordinates in the subsurface in addition to the depth below Kelly bushing 52. At step 420, a reference time and drilling location 208 are selected, and a subset of the microseismic data selected for voxels proximate the reference time and the location of the drill bit are selected at step 424. At step 428, an initial velocity model down to drilling location 208 is estimated. A subset of the microseismic data are processed through the SET algorithms using the estimated velocity function to locate microseismic events at step 432.

Once the microseismic events have been identified on the SET processed microseismic data, at step 436 the difference between the actual drill bit time and location and the location within the SET output data of the microseismic event identified as originating at the drill bit location is determined. If the discrepancy in location exceeds a predetermined value, the velocity model is modified at step 440 to account for the discrepancy, and the data a processed again through the SET software. This process is repeated as necessary until the location shown in the SET output data is considered close to the reference time and drill bit location. At this point, the velocity model is accepted as being substantially accurate, in step 444.

Still referring to FIG. 4, a new reference time and drill bit location are then chosen at step 448. A new subset of the microseismic data for voxels proximate the new reference time and the location of the drill bit are selected at step 452. A new velocity model is created at step 456 using the velocity model determined in the preceding steps, with an estimate added for the seismic velocity of the geologic layers between the previous and the new drill bit locations. The subset of the data is processed using the SET algorithms and new velocity model, at step 460, and the location of the origin of the seismic energy released as drill bit noise is again determined. As before, the estimated and known locations of the drill bit are compared at step 464, and if necessary the velocity model is refined at step 468. When the time and location of the drill bit estimated from the SET output data matches the known time and location of the drill bit, the velocity model is accepted at step 472.

The procedure is repeated at predetermined intervals, as shown at step 476, until the entire vertical and horizontal extent of the well bore has been drilled and a velocity model computed for the geologic layers between the well bore and surface 8, as shown at step 480. The velocity model is now available for use in subsequent hydraulic fracturing operations.

Additional steps may be performed according to other embodiments of this method, including filtering to enhance the quality of the microseismic data, filtering to remove organized noise, and other signal enhancements which will be understood by those skilled in the art after reading this specification. These additional steps may be performed before, concurrent with or after any of the steps shown in FIG. 4. Further, the order of some of the steps shown in FIG. 4 may be changed, as those skilled in the art will understand after reading this specification.

Figure 5:
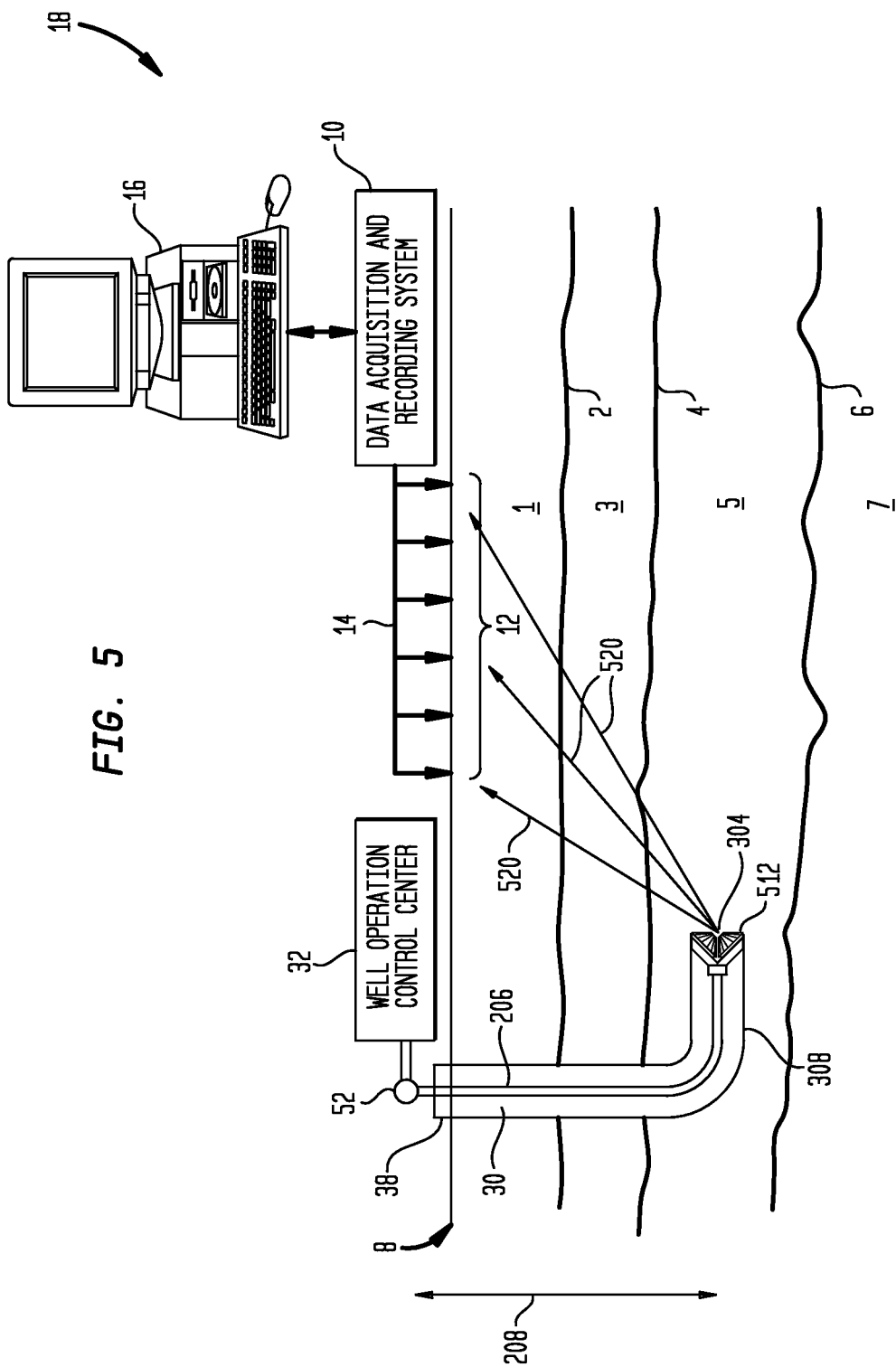
FIG. 5 shows a drill bit in use as a seismic source with the seismic energy being recorded during horizontal drilling close to the vertical well bore.

Referring now to FIG. 5, there is shown a drilling operation in which horizontal well bore 308 has just been started. Seismic energy 520 created by drill bit 304 at position 512 travels through geologic layers 5, 3 and 1 to sensors 12. The travel path of seismic energy 520 is different from that of seismic energy 216 shown in FIG. 2. The different travel path enables the velocity model to be extended horizontally from the velocity model determined at vertical well bore 30.

Figure 6:
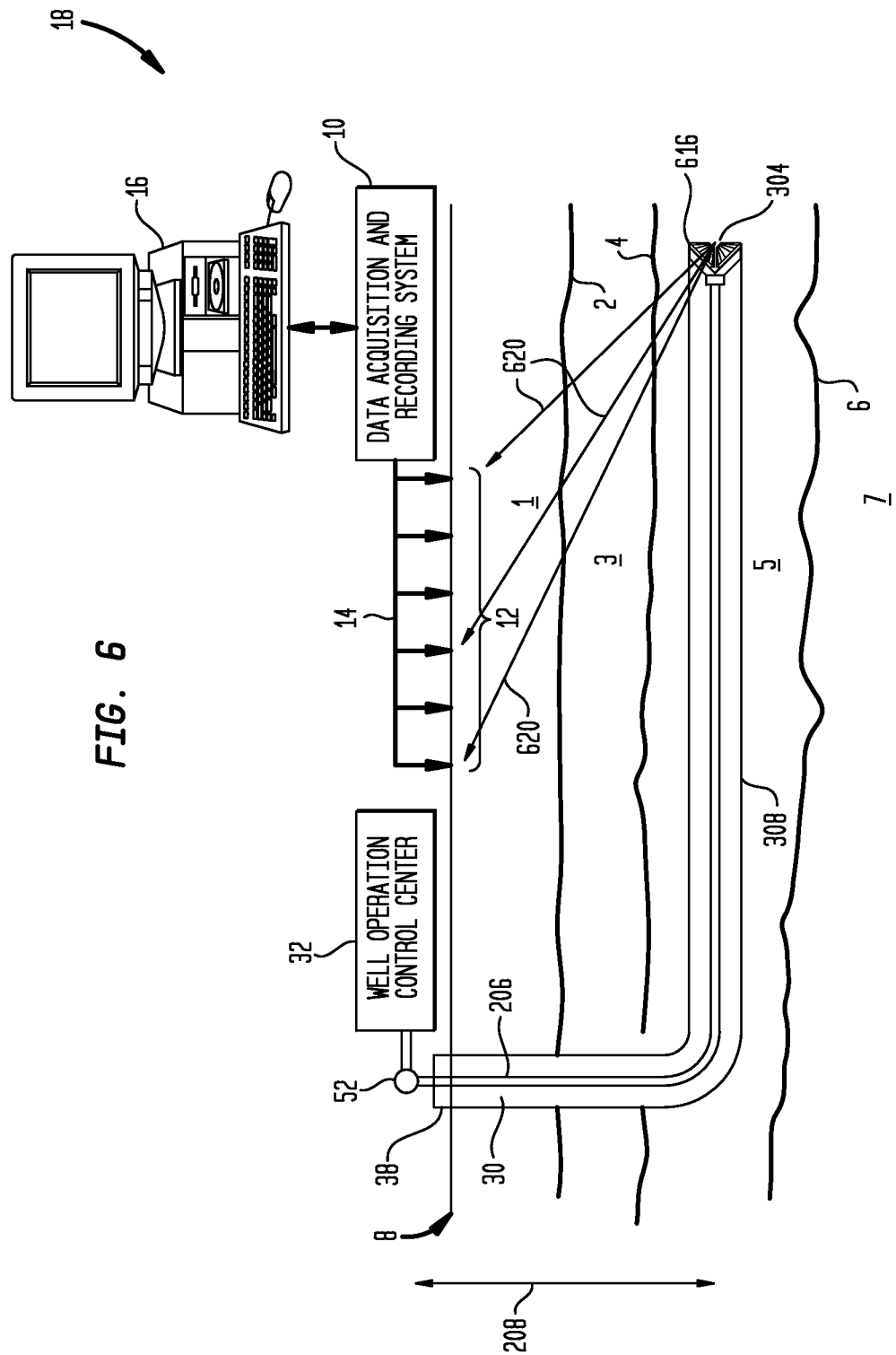
FIG. 6 shows a drill bit in use as a seismic source with the seismic energy being recorded during horizontal drilling at a significant distance from the vertical well bore.

Referring now to FIG. 6, there is shown a drilling operation in which horizontal well bore 308 has progressed a significant distance from horizontal well bore 30. In some embodiments horizontal well bore 308 may extend thousands of feet from vertical well bore 30. Seismic energy 620 travels through geologic layers 5, 3 and 1 to sensors 12. The travel path of seismic energy 620 is different from that of seismic energy 216 shown in FIG. 2. It is also different from that of seismic energy 520 as shown in FIG. 5. The different travel path enables the velocity model to be extended in a horizontal manner from the velocity model determined when drill bit 304 was close to vertical well bore 30.

Further, seismic energy 620 arrives at sensors 12 from a different direction from that seen in FIG. 5, having traveled through geologic layers 5, 3 and 1 along different paths. When further horizontal well bores 300 are drilled, in different directions from vertical well bore 30, seismic energy arrives at a given sensor 12 from several different directions. Thus the method allows not only the analysis of the spatial variation of the velocity model, but also provides information about the anisotropy of the velocity of the seismic waves, with different values for the velocity as the seismic energy travels through geologic layers 5, 3 and 1 in different directions. When the microseismic data from a fracturing operation is processed through the SET algorithms, the previously discussed time shifts, which compensate for the travel time from the energy source to the sensor, may be computed using an optimal velocity function based on the location of the fracture focus within the geologic layers, and also on the direction from the fracture zone to the sensor. Having this information available produces an improved image of the fractures. Having the velocity information available before the fracturing begins enables the improved image to be computed in close to real time, such that the progress of the fracturing operation may be closely monitored.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

I claim:

1. A method for determining the velocity of seismic energy in geologic layers using Seismic Emission Tomography (SET) imaging of drill bit noise, comprising:
   recording microseismic data resulting from drill bit noise during a drilling operation in a well bore;
   recording times and positions corresponding to such times of said drill bit in said well bore during the drilling operation;
   processing the microseismic data using an estimated velocity model to image microseismic events corresponding to the drill bit times and positions;
   determining the times and locations of microseismic events corresponding to the drill bit times and position in the microseismic data;
   computing, from the microseismic data, differences between the drill bit times and positions and times and positions of microseismic events corresponding thereto; and
   repeating said processing, determining and computing steps while varying the estimated velocity model to minimize the difference between said drill bit times and positions and times and positions of microseismic events corresponding thereto, thereby determining said velocity of seismic energy.

2. The method of claim 1, wherein the drill bit times and positions are substantially continuously recorded.

3. The method of claim 1, wherein the microseismic data are processed with SET software.

4. The method of claim 1, further comprising processing the microseismic data to image microseismic events corresponding to later times and positions of the drill bit using the previously determined velocity model.

5. The method of claim 4, further comprising employing an estimated velocity model corresponding to an additional extent of the well bore arising from the later times and positions of the drill bit.

6. The method of claim 5, further comprising varying the estimated velocity model for the additional extent of the well bore to minimize differences between known times and positions of the drill bit and times and positions of microseismic events corresponding thereto.

7. The method of claim 6, further comprising estimating a velocity model for the entire drilled well.

8. The method of claim 7, further comprising processing microseismic data recorded during hydraulic fracturing operations using the estimated velocity model for the entire drilled well.

9. The method of claim 1, further comprising stopping and restarting the drill bit at known times and positions to further calibrate the velocity model.

10. The method of claim 1, wherein the estimated velocity model is derived from analysis of conventional surface seismic data.

11. The method of claim 1, wherein the estimated velocity model is derived from analysis of well log data.

12. The method of claim 1, wherein processing the microseismic data further comprises computing the summed value of a plurality of microseismic traces at the time and position of a microseismic event.

13. The method f claim 1, wherein processing the microseismic data further comprises computing the semblance of a plurality of microseismic traces at the time and position of a microseismic event.

14. A method for determining the anisotropy of the velocity of seismic energy in geologic layers using Seismic Emission Tomography (SET) imaging of drill bit noise, comprising:
   recording microseismic data resulting from drill bit noise during a drilling operation in a well bore using a plurality of sensors;
   recording times and positions corresponding to such times of said drill bit in said well bore during the drilling operation;
   selecting subsets of the microseismic data corresponding to sensors having positions at selected azimuths from the positions of the drill bit;
   processing the subsets of the microseismic data using an estimated velocity model to image microseismic events corresponding to the drill bit times and positions;
   determining the times and locations of microseismic events corresponding to the drill bit times and positions in the microseismic data;
   computing, from the microseismic data, differences between the drill bit times and positions and times and positions of microseismic events corresponding thereto and
   repeating said processing, determining and computing steps while varying the estimated velocity model to minimize the difference between said drill bit times and positions and times and positions of microseismic events corresponding thereto, thereby determining the anisotropy of the velocity of seismic energy.

15. The method of claim 14, further comprising processing the subsets of the microseismic data to image microseismic events corresponding to later times and positions of the drill bit using the previously determined velocity model.

16. The method of claim 15, further comprising employing an estimated velocity model corresponding to an additional extent of the well bore arising from the later times and positions of the drill bit.

17. The method of claim 16, further comprising estimating a velocity model for the subsurface of the earth proximate the entire drilled well incorporating velocity anisotropy information derived from velocity models computed at a plurality of pairs of drill positions and sensor location azimuths.

18. The method of claim 17, further comprising processing microseismic data recorded during hydraulic fracturing operations using the estimated anisotropic velocity model for the entire drilled well.

19. The method of claim 14, further comprising stopping and restarting the drill bit at precisely known times and positions in order to further calibrate the velocity model.

20. The method of claim 14, wherein the drill bit times and positions are substantially continuously recorded.

21. The method of claim 14, wherein the estimated velocity model is derived from analysis of conventional surface seismic data.

22. The method of clam 14, wherein the estimated velocity model is derived from analysis of well log data.

23. The method of claim 14, wherein the subsets of the microseismic data are processed with SET software.

24. The method of claim 14, wherein processing the subsets of the microseismic data further comprises computing the summed value of a plurality of microseismic traces at the time and position of a microseismic event.

25. The method of claim 14, wherein processing the subsets of the microseismic data further comprises computing the semblance of a plurality of microseismic traces at the time and position of a microseismic event.

* * * * *